United States Patent Office 3,496,270
Patented Feb. 17, 1970

---

3,496,270
PESTICIDAL PREPARATIONS
Clarence James Counselman, Vero Beach, Fla., assignor to Ciba Corporation, New York, N.Y., a corporation of Delaware
No Drawing. Filed Feb. 28, 1967, Ser. No. 619,206
Int. Cl. A01n 9/36
U.S. Cl. 424—211
3 Claims

ABSTRACT OF THE DISCLOSURE

Compositions comprising compounds of the formula

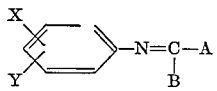

wherein X is a member selected from the group consisting of chlorine, bromine, lower alkyl, lower alkoxy, $CF_3$ or $NO_2^-$, Y is a member selected from the group consisting of bromine, lower alkyl, lower alkoxy, $CF_3$ or $No_2^-$, and A is (1) a radical of the formula

wherein $R_1$ and $R_2$ each are a lower alkyl radical and (2) a member selected from the group consisting of the piperidine, pyrrolidino, morpholino, cyclohexamethyleneimino and cyclopentamethyleneimino radical, and B represents a member selected from the group consisting of hydrogen or methyl, and compounds of the formula

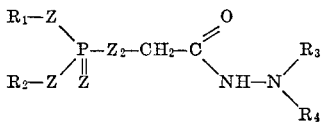

wherein $R_1$ and $R_2$ each are a lower alkyl radical containing two to four carbon atoms, $R_3$ and $R_4$ each are a lower alkyl radical containing one to four carbon atoms, one Z represents a sulfur atom and the remaining Z's are sulfur or oxygen.

BRIEF SUMMARY

The present invention relates to and has for its objects the provision of pesticidal preparations containing as active principle, a mixture of (I) A compound of the general formula

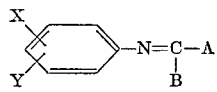

wherein X represents a member selected from the group consisting of chlorine, bromine, lower alkyl, lower alkoxy, $CF_3$ and $NO_2^-$, Y represents a member selected from the group consisting of bromine, lower alkyl, lower alkoxy, $CF_3$ and $NO_2^-$, and A represents (1) a radical of the formula

wherein $R_1$ and $R_2$ each represents a lower alkyl radical and (2) a member selected from the group consisting of the piperidine, pyrrolidino, morpholino, cyclohexamethyleneimino and cyclopentamethyleneimino radical, and B represents a member selected from the group consisting of hydrogen and methyl, with (II) A compound of the general formula

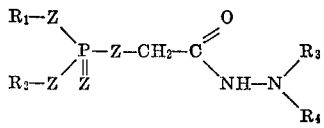

wherein $R_1$ and $R_2$ each represents a lower alkyl radical containing two to four carbon atoms, $R_3$ and $R_4$ each represents a lower alkyl radical containing one to four carbon atoms, one Z represents a sulfur atom and the remaining Z's represent a sulfur atom or an oxygen atom.

DETAILED DESCRIPTION

The preparation of the compounds of the general formula (I) is advantageously carried out by heating the appropriate arylisocyanates with an N:N-disubstituted amide of a lower carboxylic acid, for example, dimethylformamide, N:N - dimethylacetamide, N - formyl- and N-acetyl pyrrolidine or piperidine. The course of the reaction can easily be followed by the $CO_2$ that is developed.

Instead of the isocyanates, the corresponding carbamic acid chlorides can be used with similar success.

The preparation of the compounds of the general Formula II is advantageously carried out by the condensation of a compound of the formula

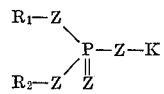

wherein $R_1$, $R_2$ and Z have the meanings given above and K represents a cation, for example, an alkali metal ion, with a compound of the formula

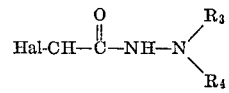

wherein $R_3$ and $R_4$ have the meanings given above and Hal represents a halogen atom, such as bromine or chlorine, with the splitting off of a substance of the formula K Hal.

Preferred preparations of the invention of the composition defined above are those which contain as component (a) the compound of the formula

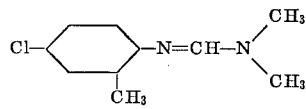

and as component (b) the compound of the formula

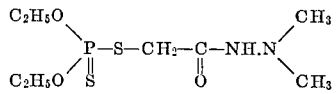

The quantitative ratio in which the two components (a) and (b) are present can vary within comparatively wide limits. While ratios of from 10:1::1:10 can be employed, it has been found to be especially advantageous if the ratio of (a) to (b) is within the range of 4:1 to 1:4, preferably 1:1.

The new preparations can be used for combating, for example, harmful insects, nematodes and gastropodes and can be used, for example, for protecting plants, materials and stored goods, general sanitary purposes and veterinary purposes. The new preparations are especially suitable for combating harmful acarids.

In plant protection the new preparations can be used, for example, for combating acarids and other pests that cause damage to fruits and vegetables, and they can also be used for combating cotton pests.

It is particularly surprising that the effect produced by a mixture of the components (a) and (b), for example, on acarids, is substantially greater than the sum of the effects of each agent acting alone. It is thus evident that synergism occurs when components (a) and (b) are admixed. By using the mixtures of the invention instead of the single components (a) and (b) it is possible to reduce substantially the amount of active principle required to kill the pests; furthermore, the mixtures have a surprisingly rapid action and show very good persistency. When used in combating acarids and insects, the new preparations act upon their various stages of development, such as ova, larvae and adults.

A very wide variety of substances can be protected from pests, particularly from acarids. Examples of substances or bodies to be protected or that may serve as supports are liquids such as water in ponds, objects in inhabited rooms, cellars, attics, stables, lofts and the like and also fur, feathers, wool and the like, as well as living organisms of the plant and animal kingdom in their various stages of development.

Combating of the acarids and other pests is carried out by the usual methods, for example, by treating the bodies to be protected with the compounds in the form of dusting or spraying preparations, for example, in the form of solutions or suspensions prepared with water or suitable organic solvents, for example, alcohol, petroleum or tar distillates. Good results are also achieved with aerosols.

The spraying and dusting preparations can contain the usual inert fillers, for example, kaolin or bentonite or further additives, for example, sulphite waste liquor, cellulose derivatives and the like, and they can also contain the usual wetting agents and adhesives to improve their wetting power and adhesion.

The following examples illustrate the invention. Unless otherwise stated, the parts and percentages are by weight.

EXAMPLE 1

I 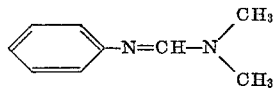

N-phenyl-N':N'-dimethyl-formamidine (a) *Free base.*—100 milliliters of carefully purified dimethylformamide and 50 milliliters of phenylisocyanate were heated under reflux with the exclusion of moisture until the evolution of carbon dioxide was finished. The solution was then fractionated in vacuo. After a first-running of unreacted dimethylformamide, the product distilled at 140° C. under a pressure of 18 millimeters of Hg. Yield: 39.5 grams.

(b) *Hydrogen sulfate.*—20 grams of the free base obtained as described under I(a) were dissolved in 50 milliliters of absolute alcohol. To this solution were added, dropwise with cooling, 13.5 grams of concentrated sulfuric acid. The resulting crystals were filtered off and washed with ether. Yield: 26 grams. Melting point: 169 to 182° C. (recrystallized from absolute alcohol).

*Analysis.*—Calculated for $C_9H_{14}O_4N_2S$: C, 43.89%; H, 5.73%; N, 11.38%. Found: C, 43.94%; H, 5.84%; N, 11.28%.

II 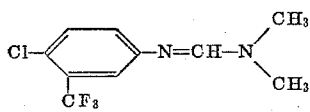

N-3-trifluoromethyl-4-chlorophenyl-N':N'-dimethyl-formamidine (a) *Free base.*—This was prepared from 60 grams of 4-chloro-3-trifluoromethylphenyl-isocyanate and 100 milliliters of dimethylformamide by the method described under I(a). Boiling point: 164° C. at 18 millimeters of Hg. Yield: 77 grams.

*Analysis.*—Calculated for $C_{10}H_{10}N_2ClF_3$: C, 47.92%; H, 4.02%; Cl, 14.15%. Found: C, 47.93%; H, 4.27%; Cl, 14.40%.

(b) The hydrogen sulfate was prepared from 20 grams of the free base II(a) and 7.9 grams of concentrated sulfuric acid by the method described under I(b). Yield: 21.5 grams, melting point 203 to 205° C. (recrystallized from absolute alcohol).

*Analysis.*—Calculated for $C_{10}H_{12}O_4N_2ClSF_3$: C, 34.44%; H, 3.47%; Cl, 10.17%. Found: C, 34.69%; H, 3.66%; Cl, 9.88%.

III 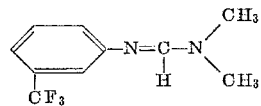

N-3-trifluoromethylphenyl-N':N'-dimethyl-formamidine

*Free base.*—This was prepared from 60 grams of meta-trifluoromethyl-phenylisocyanate and 100 milliter of dimethylformamide by the method described under I(a). Yield 73 grams. Boiling point: 93 to 95° C. at 0.01 millimeter of Hg.

*Analysis.*—Calculated for $C_{10}H_{11}N_2F_3$: C, 55.55%; H, 5.13%; N, 12.96%. Found: C, 55.31%; H, 5.41%; N, 12.82%.

IV. 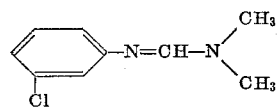

N-3-chlorophenyl-N':N'-dimethyl-formamidine (a) *Free base.*—This was prepared from 60 grams of meta-chlorophenylisocyanate and 100 milliliters of dimethylformamide by the method described under I(a). Yield: 55 grams. Boiling point: 124° C. at 0.05 millimeter of Hg.

*Analysis.*—Calculated for $C_9H_{11}N_2Cl$: C, 59.18%; H, 6.07%. Found: C, 58.9%; H, 6.2%.

(b) *Perchlorate.*—This was prepared from 20 grams of the free base IV(a) and 12 milliliters of perchloric acid of 60% strength in absolute alcohol. Melting point: 183 to 185° C. (recrystallized from a mixture of alcohol and ether).

*Analysis.*—Calculated for $C_9H_{12}O_4N_2Cl_2$: C, 38.18%; H, 4.27%; Cl, 25.05%. Found: C, 38.17%; H, 4.25%; Cl, 25.21%.

V. 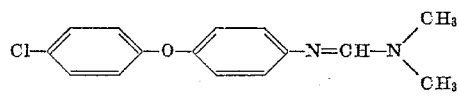

N-para-chlorophenoxyphenyl-N':N'-dimethylformamidine (a) *Free base.*—This was prepared from 60 grams of para-chlorophenoxyphenyl-isocyanate and 100 milliliters of dimethylformamide. Yield: 50 grams. Melting point: 80 to 81.5° C. Boiling point 209° C. at 0.05 millimeter of Hg.

*Analysis.*—Calculated for $C_{15}H_{15}ON_2Cl$: Cl, 12.91%. Found: Cl. 13.13%.

(b) *Hydrogen sulfate.*—This was prepared from 20 grams of the free base V(a) and 7.2 grams of concentrated sulfuric acid by the method described under I(b). Yield: 21 grams. Melting point: 186 to 194° C. (recrystallized from absolute alcohol).

*Analysis.*—Calculated for $C_{15}H_{17}O_5N_2ClS$: C, 48.32%; H, 4.60%; Cl, 9.51%. Found: C, 48.6%; H, 4.5%; Cl, 9.7%.

VI. 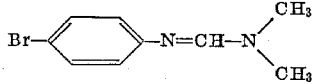

N-para-bromophenyl-N':N'-dimethyl-formamidine

*Free base.*—This was prepared by heating 50 grams of para-bromophenyl-isocyanate with 100 milliliters of dimethylformamide. Yield: 45 grams. Boiling point: 173° C. at 14 millimeters of Hg.

*Analysis.*—Calculated for $C_9H_{11}N_2Br$: C, 47.60%; H, 4.88%; N, 12.34%. Found: C, 47.3%; H, 4.9%; N, 12.1%.

VII. 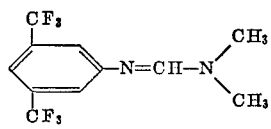

N-3:5-ditrifluoromethylphenyl-N':N'-dimethylformamidine

*Perchlorate.*—This was prepared by heating 50 milliliters of 3:5-ditrifluoromethylphenylisocyanate with 100 milliliters of dimethylformamide until the evolution of gas ceased. The solution was cooled and 22 milliliters of perchloric acid of 60% strength were added dropwise. The product was precipitated with ether. Yield: 70 grams. Melting point: 256 to 261° C. (after recrystallization from a mixture of alcohol and ether).

*Analysis.*—Calculated for $C_{11}H_{11}O_4N_2ClF_6$: C, 34.35%; H, 2.88%; N, 7.28%. Found: C, 34.37%; H, 2.65%; N, 7.24%.

VIII 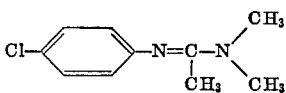

N-para-chlorophenyl-N':N'-dimethyl-acetamidine

*Perchlorate.*—This was prepared by heating 50 grams of para-chlorophenyl-isocyanate with 100 milliliters of N:N-dimethyl-acetamide at 130° C. until the evolution of gas ceased. The solution was cooled and the calculated amount of perchloric acid of 60% strength was added. A total of 29 grams of the desired amidine in the form of perchlorate was precipitated by the addition of ether. Melting point: 129° C. (after recrystallization from a mixture of alcohol and ether).

*Analysis.*—Calculated for $C_{10}H_{14}O_4N_2Cl_2$: N, 9.43%. Found: N, 9.61%.

IX. 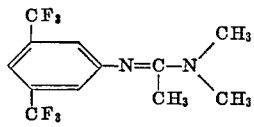

N-3:5-ditrifluoromethylphenyl-N':N'-dimethyl-acetamidine

*Perchlorate.*—This was prepared from 100 milliliters of N:N-dimethyl-acetamide, 50 milliliters of 3:5-ditrifluoromethylphenyl-isocyanate and 21.5 milliliters of perchloric acid of 60% strength by a method analogous to that described under VIII. Yield: 70.5 grams in the form of perchlorate. Melting point: 285 to 288° C. (after recrystallization from a mixture of alcohol and ether).

*Analysis.*—Calculated for $C_{12}H_{13}O_4N_2ClF_3$: C, 36.15%; H, 3.29%; N, 7.03%. Found: C, 36.25%; H, 3.17%; N, 7.09%.

X. 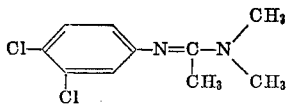

N-3:4-dichlorophenyl-N':N'-dimethyl-acetamidine

*Perchlorate.*—This was prepared from 100 milliliters of N:N-dimethylacetamide, 50 grams of 3:4-dichlorophenyl-isocyanate and 25 milliliters of perchloric acid of 60% strength by a method analogous to that described under VIII. Yield: 21 grams in the form of perchlorate. Melting point: 213 to 221° C. (after recrystallization from alcohol).

*Analysis.*—Calculated for $C_{10}H_{13}N_2Cl_3O_4$; N, 8.45%. Found: N, 8.4%.

XI 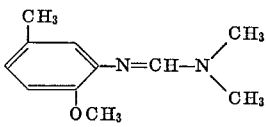

N-2-methoxy-5-methylphenyl-N':N'-dimethylformamidine

*Free base.*—This was prepared from 50 milliliters of 2-methoxy-5-methylphenyl-isocyanate and 75 milliliters of dimethylformamide by the method described under I(a). Yield: 43.5 grams. Boiling point: 92 to 95° C. at 0.05 millimeter of Hg.

*Analysis.*—Calculated for $C_{11}H_{17}O_5N_2Cl$: (perchlorate prepared as described under I(b)) C, 45.13%; H, 5.85%; N, 9.57%. Found: C, 45.09%; H, 6.09%; N, 9.67%.

The melting point of the perchlorate is 234 to 236.5° C.

XII 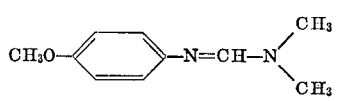

N-para-methoxyphenyl-N':N'-dimethylformamidine

*Free base.*—This was prepared from 50 milliliters of para-methoxyphenylisocyanate and 100 milliliters of dimethylformamide by the method described under I(a). Yield: 30 grams. Boiling point: 98° C. at 0.03 millimeter of Hg.

*Perchlorate.*—This was prepared by the method described under I(b). Melting point: 171 to 173° C. (after recrystallization from alcohol).

Analysis of the perchlorate: $C_{10}H_{15}O_5N_2Cl$. Calculated: C, 43.09%; H, 5.43%; N, 10.05%. Found: C, 43.3%; H, 5.7%; N, 10.3%.

The compounds listed in the following table can be prepared in an analogous manner:

| Compound | Boiling point, °C./mm. Hg | Analysis (theoretical values in brackets) | | | |
|---|---|---|---|---|---|
| | | C | H | N | Cl |
| 1. Cl-phenyl(Cl)-N=CH-N(CH₃)₂ | 120-122/0.15 | | | 12.85(12.90) | 32.51(32.66) |
| 2. phenyl(CH₃)-N=CH-N(CH₃)₂ | 78-79/0.05 | 73.76(74.03) | 8.78(8.70) | 17.41(17.27) | |
| 3. phenyl(C₃H₇(ISO))-N=CH-N(CH₃)₂ | 91-93/0.18 | 75.94(75.74) | 9.24(9.54) | 14.72(14.72) | |

| Compound | | Boiling point, °C./mm. Hg | Analysis (theoretical values in brackets) | | | |
|---|---|---|---|---|---|---|
| | | | C | H | N | Cl |
| 4 | 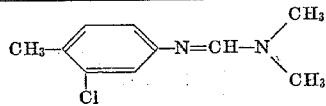 4-CH₃, 3-Cl-C₆H₃-N=CH-N(CH₃)₂ | 123–125/0.01 | 61.5(61.07) | 7.0(6.66) | -------- | 18.2(18.03) |
| 5 | 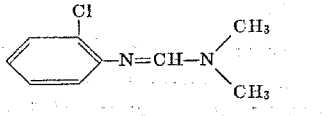 2-Cl-C₆H₄-N=CH-N(CH₃)₂ | 120–122/0.02 | 59.4(59.18) | 6.3(6.07) | -------- | 19.2(19.41) |
| 6 | 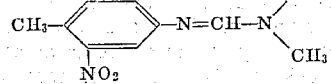 4-CH₃, 3-NO₂-C₆H₃-N=CH-N(CH₃)₂ | 154/0.1 | 58.03(57.96) | 6.35(6.32) | -------- | 20.41(20.28) |
| 7 | 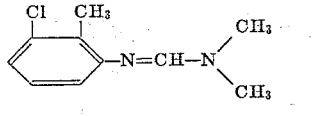 3-Cl, 2-CH₃-C₆H₃-N=CH-N(CH₃)₂ | 94/0.05 | 60.9(61.07) | 6.5(6.66) | -------- | 13.9(14.24) |
| 8 | 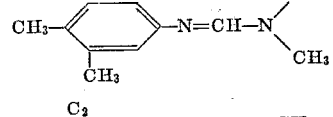 4-CH₃, 3-CH₃-C₆H₃-N=CH-N(CH₃)₂ | 93–94/0.05 | 74.70(74.95) | 9.19(9.15) | -------- | 15.97(15.90) |
| 9 | 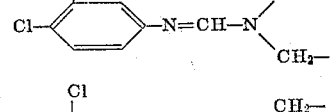 4-Cl, 3-C₂H₅-C₆H₃-N=CH-N(piperidinyl) | 167/0.015 | 56.00(56.05) | 5.38(5.49) | 10.86(10.89) | -------- |
| 10 | 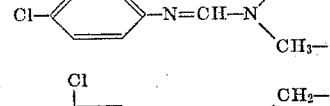 3,4-diCl-C₆H₃-N=CH-N(CH₂CH₂)(CH₃CH₂) | 163–165/0.02 | 54.19(54.34) | 5.06(4.97) | 11.28(11.52) | -------- |
| 11 | 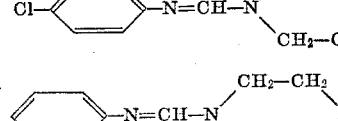 3,4-diCl-C₆H₃-N=CH-N(morpholinyl) | 152–157/0.03 | 50.82(50.98) | 4.69(4.67) | 10.70(10.81) | -------- |
| 12 | 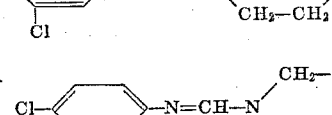 4-Cl-C₆H₄-N=CH-N(piperazinyl N-CH₃) | 160–163/0.18 | -------- | 17.7(17.68) | 14.9(14.91) | |
| 13 | 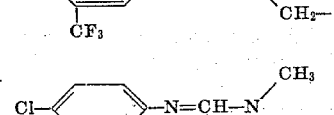 4-Cl, 3-CF₃-C₆H₃-N=CH-N(CH₂CH₂CH₂)(CH₂CH₂CH₂) | 143–145/0.11 | 55.41(55.18) | 5.35(5.29) | -------- | 11.57(11.63) |
| 14 | 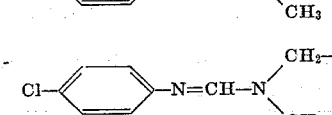 4-Cl-C₆H₄-N=CH-N(CH₃)₂ | 101–103/0.06 | -------- | 15.21(15.34) | 19.63(19.41) | |
| 15 | 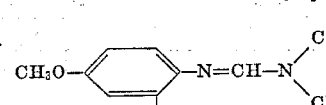 4-Cl-C₆H₄-N=CH-N(CH₂CH₂CH₂)(CH₂CH₂CH₂) | 161–162/0.04 | 65.42(65.92) | 7.11(7.24) | 11.80(11.83) | 15.05(14.98) |
| 16 | 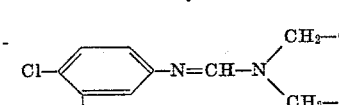 4-CH₃O, 2-CH₃-C₆H₃-N=CH-N(CH₃)₂ | 160–161/9 | 68.72(68.72) | 8.54(8.39) | 14.69(14.57) | -------- |
| 17 | 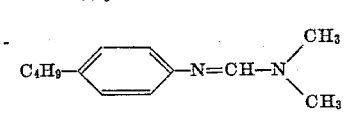 4-Cl, 3-CF₃-C₆H₃-N=CH-N(morpholinyl) | 140–143/0.1 | 49.49(49.24) | 4.34(4.13) | 9.46(9.57) | -------- |
| 18 |  4-C₄H₉-C₆H₄-N=CH-N(CH₃)₂ | 106/0.08 | 76.28(76.42) | 9.91(9.87) | 13.74(13.71) | -------- |

| Compound | Boiling point, °C./mm. Hg | Molecular weight | Melting point, °C. |
|---|---|---|---|
| 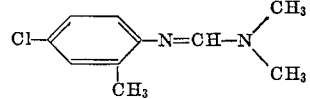 | 163-165/14 | 196.7 | 35 |

EXAMPLE 2

20.8 parts of the sodium salt of diethyldithiophosphoric acid are dissolved in 50 parts by volume of methyl ethyl ketone. To this solution there is added dropwise over a period of one-half hour a solution of 13.7 parts of chloroacetic acid-N-dimethyl hydrazide in 50 parts by volume of methyl ethyl ketone. The temperature of the mixture will rise to 30° C. The mixture is heated over a period of six hours to 60–65° C., the sodium chloride which precipitates is filtered off and the filtrate evaporated at 60° C. The residue is taken up in 60 parts by volume of chloroform and washed twice with 20 parts of water and again with 20 parts of aqueous sodium bicarbonate. The organic layer is separated and dried over calcium chloride and evaporated in vacuo. The residue obtained is purified by trituration with 20.9 parts of water. The product obtained melts at 66° C. and has the formula $C_8H_{19}O_3N_2PS_2$. By selection of the appropriate starting materials other compounds within general Formula (b) can also be prepared.

EXAMPLE 3

Spraying concentrates having the compositions (a), (b) and (c) are prepared.

(a) 40 parts of the active substance of the formula

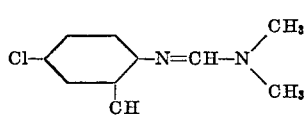

are mixed with 15 parts of an emulsifier consisting of a mixture of 6 parts of the calcium salt of monolauryl benzenemonosulfonic acid and 14 parts of the polyglycol ether of para-isooctylphenol and diluted with 45 parts of xylene. A clear solution is thus obtained which can be used as a spraying concentrate and emulsified by pouring into water.

(b) 36 parts of the active substance of the formula

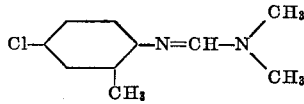

are mixed with 10 parts of an emulsifier consisting of 6 parts of the calcium salt of monolauryl benzenemonosulfonic acid and 14 parts polyglycol ether of sorbitanmonolaurate, 36 parts of isophorone and 18 parts of dimethylformamide to provide a spray concentrate which can be readily diluted with water.

(c) The compositions of parts (a) and (b) are mixed to provide a composition having a 1:1 ratio of active ingredients.

EXAMPLE 4

The spray concentrates (a), (b) and (c) of Example 3 were bulked to concentrations specified in the table below with water.

Cotton plants infested with spider mite are sprayed all over with the resulting composition. Assessments are made 2, 7 and 14 days after treatment by counting the surviving and the dead mites on each of 5 marked leaves.

The results are shown in the following table.

| Composition | Percent concentration of active substances | Pre-test count | Spider mites per leaf at indicated intervals after treatment | | |
|---|---|---|---|---|---|
| | | | 2-day | 7-day | 14-day |
| Example 3a | 0.05 | 24.4 | 6.3 | 11.8 | 22.6 |
| Do | 0.025 | 43.5 | 19.9 | 11.8 | 42.6 |
| Example 3b | 0.05 | 43.5 | 0.0 | 0.0 | 16.3 |
| Do | 0.025 | 38.0 | 3.5 | 3.5 | 26.3 |
| Example 3c | 0.05 | 29.2 | 0.0 | 0.0 | 3.7 |
| Do | 0.025 | 32.7 | 0.5 | 1.3 | 15.7 |
| Do | 0.013 | 31.0 | 1.4 | 0.9 | 11.1 |

What is claimed is:

1. An acaricidal composition comprising (a) not more than an effective acaricidal amount of a compound of the formula

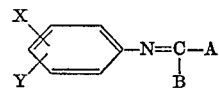

wherein X represents a member selected from the group consisting of chlorine, bromine, lower alkyl, lower alkoxy, $CF_3$ and $NO_2$, Y represents a member selected from the group consisting of bromine, lower alkyl, lower alkoxy, $CF_3$ and $NO_2$, and A represents (1) a radical of the formula

wherein $R_1$ and $R_2$ each represents a lower alkyl radical and (2) a member selected from the group consisting of the piperidino, pyrrolidino, morpholino, cyclohexamethyleneimino and cyclopentamethyleneimino radical, and B represents a member selected from the group consisting of hydrogen and methyl, and (b) an effective acaricidal amount of

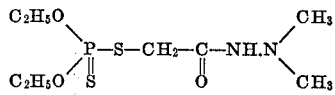

wherein the quantitative ratio in which the two components (a) and (b) are present is within the ratio of from 10:1:1:10, together with a carrier therefor.

2. An acaricidal composition according to claim 1 comprising (a) not more than an effective acaricidal amount of

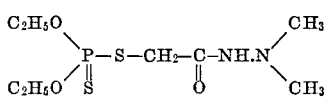

and component (b) is an effective acaricidal amount of

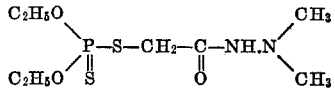

and (c) a carrier therefor.

3. In the art of controlling acarids with not more than an effective acaricidal amount of (a) a compound of the formula

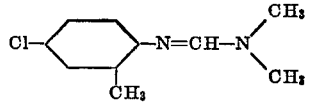

the improvement which consists of the step of contacting said acarids with an effective acaricidal amount of (a) and (b) a compound of the formula

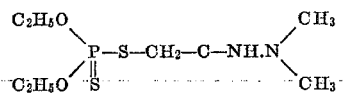

in order to thereby obtain effective acaricidal control substantially greater than the sum of the effects of effective acaricidal amounts of each component (a) and (b) acting alone, together with a carrier therefor.

References Cited

UNITED STATES PATENTS 3,284,289   11/1966   Duerr et al. _____ 424—248

OTHER REFERENCES

Chem. Abstracts 66 (25), P11538t, June 19, 1967 (of USSR 185,913 Sept. 12, 1966).

S. K. ROSE, Primary Examiner

U.S. Cl. X.R.

424—244, 248, 250, 256, 274, 330